United States Patent [19]
Emerson et al.

[11] Patent Number: 5,827,491
[45] Date of Patent: Oct. 27, 1998

[54] PROCESS FOR PREPARING THE SYNTHETIC POROUS CRYSTALLINE MATERIAL MCM-56

[75] Inventors: Sean C. Emerson, Voorhees, N.J.; Shiu Lun Anthony Fung, Wilmington, Del.; Stephen Latham Lawton, Pitman; Wieslaw Jerzy Roth, Sewell, both of N.J.

[73] Assignee: Mobil Oil Corporation, Fairfax, Va.

[21] Appl. No.: 684,664

[22] Filed: Jul. 22, 1996

Related U.S. Application Data

[63] Continuation-in-part of Ser. No. 452,919, May 30, 1995, Pat. No. 5,557,024, which is a continuation of Ser. No. 249,609, May 26, 1994, Pat. No. 5,453,554, which is a continuation-in-part of Ser. No. 51,952, Apr. 26, 1993, Pat. No. 5,362,697.

[51] Int. Cl.⁶ ..................................................... B01J 29/04
[52] U.S. Cl. ...................................... 423/328.2; 423/329.1
[58] Field of Search ..................................... 585/446, 453, 585/462; 423/718, 328.2, 329.1; 502/71, 60, 62, 77

[56] References Cited

U.S. PATENT DOCUMENTS

| | | | |
|---|---|---|---|
| 4,439,409 | 3/1984 | Puppe et al. | 423/328 |
| 4,826,667 | 5/1989 | Zones et al. | 423/328 |
| 4,954,325 | 9/1990 | Rubin et al. | 423/328 |
| 4,981,663 | 1/1991 | Rubin | 423/277 |
| 5,021,141 | 6/1991 | Rubin | 208/46 |
| 5,236,575 | 8/1993 | Bennett et al. | 502/77 |

*Primary Examiner*—Michael L Lewis
*Assistant Examiner*—Thomas G. Dunn, Jr.
*Attorney, Agent, or Firm*—Peter W. Roberts; Malcolm D. Keen

[57] ABSTRACT

The synthetic porous crystalline material, MCM-56, is synthesized by a process comprising the steps of:

a) preparing a reaction mixture containing sources of alkali or alkaline earth metal (M) cation, an oxide of an trivalent element X, an oxide of a tetravalent element Y containing at least 30 wt. % of solid $YO_2$, a directing agent (R), and water, said reaction mixture having a composition, in terms of mole ratios of oxides, within the following ranges:

$YO_2/X_2O_3$ 5 to 35
$H_2O/YO_2$ 10 to 70
$OH^-/YO_2$ 0.05 to 0.5
$M/YO_2$ 0.05 to 3.0
$R/YO_2$ 0.1 to 1.0 b) crystallizing said mixture at a temperature of about 80° C. to about 225° C., preferably about 125° C. to about 140° C., to form crystals of MCM-56, c) terminating said crystallization prior to the formation of a significant quantity of MCM-49, and d) separating the MCM-56 crystals from the reaction mixture.

12 Claims, 9 Drawing Sheets

PROCESS FOR PREPARING THE SYNTHETIC POROUS CRYSTALLINE MATERIAL MCM-56

CROSS-REFERENCE TO RELATED APPLICATIONS

This application is a continuation-in-part of U.S. patent application Ser. No. 08/452,919, filed May 30, 1995, now U.S. Pat. No. 5,557,024, which is a continuation of U.S. patent application Ser. No. 08/249,609, filed May 26, 1994, now U.S. Pat. No. 5,453,554, which is a continuation-in-part of U.S. patent application Ser. No. 08/051,952, filed Apr. 26, 1993, now U.S. Pat. No. 5,362,697

FIELD OF THE INVENTION

This invention relates to a process for preparing the synthetic porous crystalline material, designated MCM-56.

DESCRIPTION OF THE PRIOR ART

Porous inorganic solids have found utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of x-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the para-crystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "x-ray indifferent". The microstructure of the silicas consists of 100–250 Angstrom particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pores tend to be distributed over a rather large range. This lack of order also manifests itself in the x-ray diffraction pattern, which is usually featureless.

Paracrystalline materials such as the transitional aluminas also have a wide distribution of pore sizes, but better defined x-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987). Since, in the case of either material, there is no long range order controlling the sizes of pores in the material, the variability in pore size is typically quite high. The sizes of pores in these materials fall into a regime called the mesoporous range, including, for example, pores within the range of about 15 to about 200 Angstroms.

In sharp contrast to these structurally ill-defined solids are materials whose pore size distribution is very narrow because it is controlled by the precisely repeating crystalline nature of the materials' microstructure. These materials are called "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$, in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as $Ca/2$, $Sr/2$, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolites A (U.S. Pat. No. 2,882,243); X (U.S. Pat. No. 2,882,244); Y (U.S. Pat. No. 3,130,007); ZK-5 (U.S. Pat. No. 3,247,195); ZK-4 (U.S. Pat. No. 3,314,752); ZSM-5 (U.S. Pat. No. 3,702,886); ZSM-11 (U.S. Pat. No. 3,709,979); ZSM-12 (U.S. Pat. No. 3,832,449), ZSM-20 (U.S. Pat. No. 3,972,983); ZSM-35 (U.S. Pat. No. 4,016,245); ZSM-23 (U.S. Pat. No. 4,076,842); MCM-22 (U.S. Pat. No. 4,954,325); MCM-35 (U.S. Pat. No. 4,981,663); MCM-49 (U.S. application Ser. No. 07/802,938); and PSH-3 (U.S. Pat. No. 4,439,409).

U.S. Pat. No. 4,439,409 refers to a crystalline molecular sieve composition of matter named PSH-3 and its synthesis from a reaction mixture containing hexamethy-leneimine, an organic compound which acts as directing agent for synthesis of the present layered MCM-56. A composition of matter appearing to be identical to the PSH-3 of U.S. Pat. No. 4,439,409, but with additional structural components, is taught in European Patent Application 293,032. Hexamethyleneimine is also taught for use in synthesis of crystalline molecular sieves MCM-22 in U.S. Pat. No. 4,954,325; MCM-35 in U.S. Pat. No. 4,981,663; MCM-49 in U.S. patent application Ser. No. 07/802,938; now U.S. Pat. No. 5,236,575 and ZSM-12 in U.S. Pat. No. 5,021,141. A molecular sieve composition of matter referred to as zeolite SSZ-25 is taught in U.S. Pat. No. 4,826,667 and European Patent Publication 231,860, said zeolite being synthesized from a reaction mixture containing an adamantane quaternary ammonium ion.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titano-metallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The x-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the x-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

MCM-56 is described in U.S. Pat. No. 5,362,697 and is an unusual material in that it exhibits features of both layered and zeolitic materials. MCM-56 is closely related to MCM-49 and is synthesized from the same reaction mixture as would be used to produce MCM-49 but with the synthesis being terminated prior to the formation of significant quantities of MCM-49.

SUMMARY OF THE INVENTION

The present invention is directed to a process for the synthesis of a synthetic porous crystalline material, MCM-56, which has an x-ray diffraction pattern including the lines listed in Table I, the process comprising the steps of:

a) preparing a reaction mixture containing sources of alkali or alkaline earth metal (M) cation, an oxide of an trivalent element X, an oxide of a tetravalent element Y containing at least 30 wt. % of solid $Y_2$, a directing agent (R), and water, said reaction mixture having a composition, in terms of mole ratios of oxides, within the following ranges:

$YO_2/X_2O_3$ 5 to 35
$H_2O/YO_2$ 10 to 70
$OH^-/YO_2$ 0.05 to 0.5
$M/YO_2$ 0.05 to 3.0
$R/YO_2$ 0.1 to 1.0 b) crystallizing said mixture at a temperature of about 80° C. to about 225° C. to form crystals of MCM-56, c) terminating said crystallization prior to the formation of a significant quantity of MCM-49, and d) separating the MCM-56 crystals from the reaction mixture.

Preferably, the crystallization is terminated prior to the formation of a significant quantity of MCM-49 as indicated by x-ray diffraction analysis in the 8.8–11.2 Angstrom d-spacing range.

Preferably, said crystallization temperature is at least 120° C., more preferably is in the range of about 120° C. to about 155° C. and most preferably is in the range of about 125° C. to about 140° C.

DESCRIPTION OF SPECIFIC EMBODIMENTS

Figure 1:
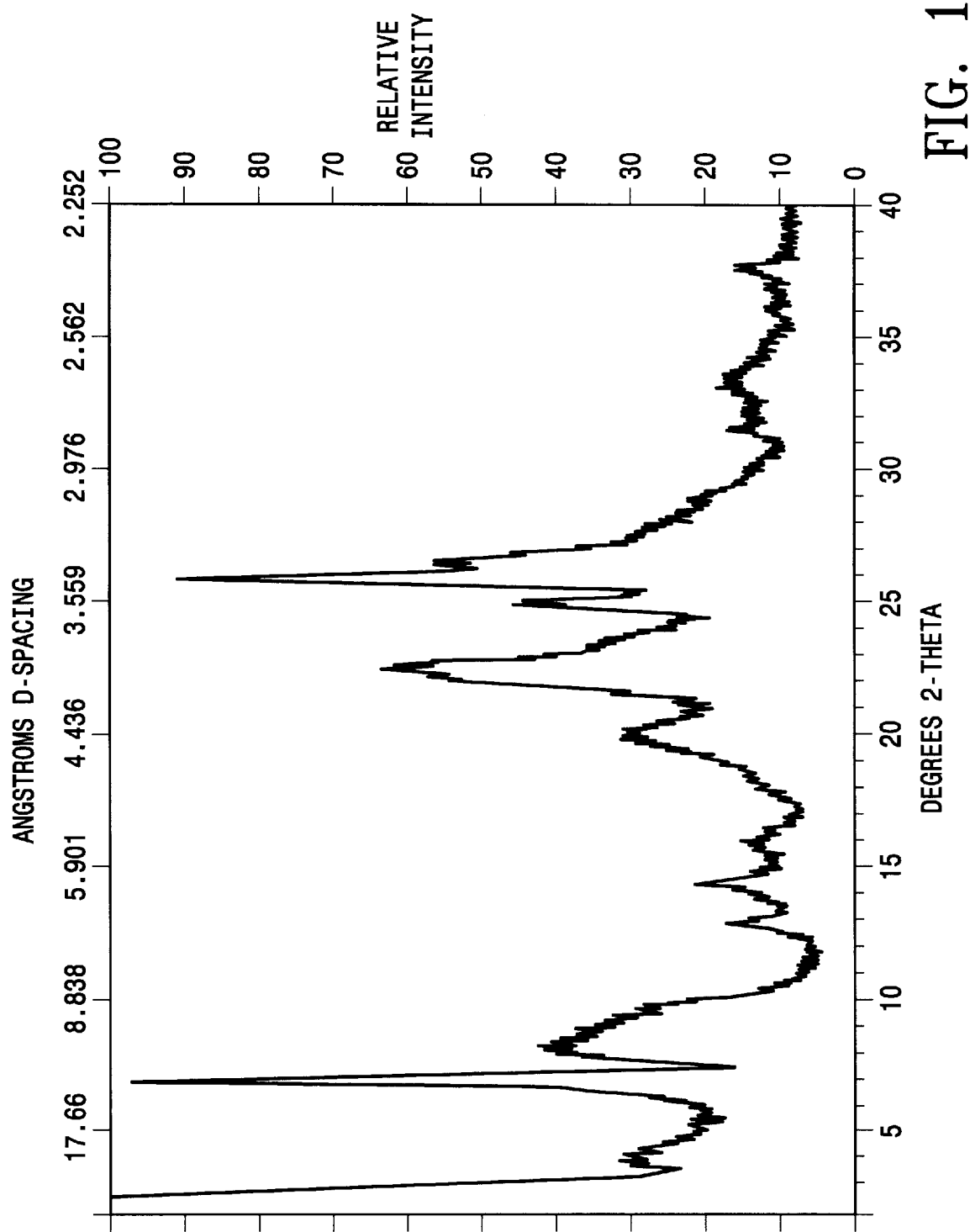
FIG. 1 shows the x-ray diffraction pattern of the dried product MCM-56 of Example 1.

The layered MCM-56 material of the invention has an x-ray diffraction pattern which is distinguished by the combination of line positions and intensities from the patterns of other known as-synthesized or thermally treated materials as shown below in Table I (as synthesized) and Table II (calcined). In these tables, intensities are defined relative to the d-spacing line at 12.4 Angstroms.

TABLE I

MCM-56 (as-synthesized)

| Interplanar d-Spacing (A) | Relative Intensity |
|---|---|
| 12.4 ± 0.2 | vs |
| 9.9 ± 0.3 | m |
| 6.9 ± 0.1 | w |
| 6.4 ± 0.3 | w |
| 6.2 ± 0.1 | w |
| 3.57 ± 0.07 | m-s |
| 3.44 ± 0.07 | vs |

TABLE II

MCM-56 (as-calcined)

| Interplanar d-Spacing (A) | Relative Intensity |
|---|---|
| 12.4 ± 0.2 | vs |
| 9.9 ± 0.3 | m-s |
| 6.9 ± 0.1 | w |
| 6.2 ± 0.1 | s |
| 3.55 ± 0.07 | m-s |
| 3.42 ± 0.07 | vs |

These x-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history.

As shown in Tables III and IV, the x-ray diffraction patterns of MCM-56, both as synthesized and as calcined, are distinguished from the corresponding patterns of the related materials MCM-22 and MCM-49. In these tables, intensities are again defined relative to the d-spacing line at 12.4 Angstroms.

TABLE III

| Closest Relative MCM-56 | | Closest Relative Layered Material | | 3-Dimensional Material MCM-49 | |
|---|---|---|---|---|---|
| Interplanar d-Spacing (A) | Relatv. Intensity | Interplanar d-Spacing (A) | Relatv. Intensity | Interplanar d-spacing (A) | Relatv. Intensity |
| — | — | 13.5 | m | — | — |
| 12.4 ± 0.2 | vs | 12.4 | m-vs | 12.5 | vs |
| — | — | 11.1 | m | 11.2 | m-s |
| 9.9 ± 0.3 | m | — | — | — | — |
| — | — | 9.2 | m | 9.0 | m |
| 6.9 ± 0.1 | w | 6.9 | w | 6.9 | w |
| 6.4 ± 0.3 | w | 6.7 | w | 6.4 | w |
| 6.2 ± 0.1 | w | 6.2 | w | 6.2 | m |
| 3.57 ± 0.07 | m-s | 3.56 | w-m | 3.55 | w-m |
| 3.44 ± 0.07 | vs | 3.43 | s-vs | 3.44 | vs |

TABLE IV

| MCM-56 | | MCM-22 | | MCM-49 | |
|---|---|---|---|---|---|
| Interplanar d-Spacing (A) | Relatv. Intensity | Interplanar d-Spacing (A) | Relatv. Intensity | Interplanar d-spacing (A) | Relatv. Intensity |
| 12.4 ± 0.2 | vs | 12.4 | m-vs | 12.4 | vs |
| — | — | 11.0 | m-s | 11.1 | s |
| 9.9 ± 0.3 | m-s | — | — | — | — |
| — | — | 8.8 | m-vs | 8.9 | m-s |
| 6.9 ± 0.1 | w | 6.9 | w-m | 6.9 | w |
| 6.2 ± 0.1 | s | 6.2 | m-vs | 6.2 | m |
| 3.55 ± 0.07 | m-s | 3.56 | w-m | 3.57 | w |
| 3.42 ± 0.07 | vs | 3.42 | vs | 3.43 | s-vs |

The significance of differences in the x-ray diffraction patterns of these materials can be explained from a knowledge of the structures of the materials. MCM-22 and PSH-3 are members of an unusual family of materials because, upon calcination, there are changes in the x-ray diffraction pattern that can be explained by a significant change in one axial dimension. This is indicative of a profound change in the bonding within the materials and not a simple loss of the organic material. The precursor members of this family can be clearly distinguished by x-ray diffraction from the calcined members (e.g., compare middle columns of Tables I and II). An examination of the x-ray diffraction patterns of both precursor and calcined forms shows a number of reflections with very similar position and intensity, while other peaks are different. Some of these differences are directly related to the changes in the axial dimension and bonding.

Crystalline MCM-49 has an axial dimension similar to those of the calcined members of the family and, hence, there are similarities in their x-ray diffraction patterns. Nevertheless, the MCM-49 axial dimension is different from that observed in the calcined materials. For example, the changes in axial dimensions in MCM-22 can be determined from the positions of peaks particularly sensitive to these changes. Two such peaks occur at ~13.5 Angstroms and ~6.75 Angstroms in precursor MCM-22, at ~12.8 Angstroms and ~6.4 Angstroms in as-synthesized MCM-49, and at ~12.6 Angstroms and ~6.30 Angstroms in the calcined MCM-22. The ~12.8 Angstroms peak in MCM-49 is very close to the intense ~12.4 Angstroms peak observed for all three materials, and is frequently not fully separated from it. Likewise, the ~12.6 Angstroms peak of the calcined MCM-22 material is usually only visible as a shoulder on the intense ~12.4 Angstroms peak. Other features which collectively distinguish MCM-56 from the similar materials described above are summarized in Table V.

TABLE V

| Feature | MCM-22 | MCM-49 | MCM-56 |
|---|---|---|---|
| As-synthesized: | | | |
| Structure | layered | 3-dimensional | layered |
| Swellable | yes | no | yes |
| Condenses upon Calcination | yes | yes | no |
| Calcined: | | | |
| Sorption capacity for 1,3,5-tri-methyl benzene[1] | low | low | high |
| Initial uptake of 2,2-di-methylbutane[2] | slow | slow | fast |

[1]Low sorption capacity is defined as less than about 8 to 10 $\mu$l/g. High capacity is at least about 4 times the low capacity. Calcined MCM-56 sorbs at least about 35 $\mu$l/g.
[2]Initial uptake is defined as time to adsorb the first 15 mg of 2,2-dimethylbutane/gram of sorbent. Fast uptake is less than 20 seconds; slow uptake is at least 5 times the fast value. One gram of calcined MCM-56 sorbs 15 mg of 2,2-dimethylbutane in less than about 20 seconds, e.g., less than about 15 seconds.

The layered material MCM-56 of this invention has a composition involving the molar relationship:

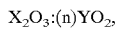

$X_2O_3:(n)YO_2$, wherein X is a trivalent element, such as aluminum, boron, iron and/or gallium, preferably aluminum; Y is a tetravalent element such as silicon and/or germanium, preferably silicon; and n is less than about 35, e.g., from about 5 to less than about 25, usually from about 10 to less than about 20, more usually from about 13 to about 18. In the as-synthesized form, the material has a formula, on an anhydrous basis and in terms of moles of oxides per n moles of $YO_2$, as follows:

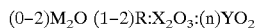

$(0-2)M_2O\ (1-2)R:X_2O_3:(n)YO_2$ wherein M is an alkali or alkaline earth metal, and R is an organic moiety. The M and R components are associated with the material as a result of their presence during synthesis, and are easily removed by post-synthesis methods hereinafter more particularly described.

The MCM-56 material of the invention may be thermally treated and in the calcined form exhibits high surface area (greater than 300 m2/gm) and unusually large sorption capacity for certain large molecules when compared to previously described materials such as calcined PSH-3, SSZ-25, MCM-22, and MCM-49. The MCM-56 wet cake, i.e., as-synthesized MCM-56, is swellable indicating the absence of interlayer bridges, in contrast with MCM-49 which is unswellable.

To the extent desired, the original alkali or alkaline earth, e.g., sodium, cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

When used as a catalyst, the layered MCM-56 material of the invention may be subjected to treatment to remove part or all of any organic constituent. The crystalline material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

MCM-56 may be thermally treated without affecting its layered structure in that it is still swellable after thermal treatment. Thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions. Non-limiting examples of such reactions include those described in U.S. Pat. Nos. 4,954,325; 4,973,784; 4,992,611; 4,956, 514; 4,962,250; 4,982,033; 4,962,257; 4,962,256; 4,992, 606; 4,954,663; 4,992,615; 4,983,276; 4,982,040; 4,962, 239; 4,968,402; 5,000,839; 5,001,296; 4,986,894; 5,001, 295; 5,001,283; 5,012,033; 5,019,670; 5,019,665; 5,019, 664; and 5,013,422, each incorporated herein by reference as to the description of said catalytic reactions.

The layered MCM-56 material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc. and at atmospheric, subatmospheric or superatmospheric pressures for between 30 minutes and 48 hours. Dehydration can also be performed at room temperature merely by placing the MCM-56 in a vacuum, but a longer time is required to obtain a sufficient amount of dehydration.

The present layered MCM-56 material is prepared from a reaction mixture containing sources of alkali or alkaline earth metal (M), e.g., sodium or potassium, cation, an oxide of trivalent element X, e.g., aluminum, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | 5 to 35 | 10 to 25 |
| $H_2O/YO_2$ | 10 to 70 | 16 to 40 |
| $OH/YO_2$ | 0.05 to 0.5 | 0.06 to 0.3 |
| $M/YO_2$ | 0.05 to 3.0 | 0.06 to 1.0 |
| $R/YO_2$ | 0.1 to 1.0 | 0.3 to 0.5 |

In the present synthesis method, the source of $YO_2$ must be comprised predominantly of solid $YO_2$, for example at least about 30 wt. % solid YO$_2$ in order to obtain the crystal product of the invention. Where YO$_2$ is silica, the use of a silica source containing at least about 30 wt. % solid silica, e.g., Ultrasil (a precipitated, spray dried silica containing about 90 wt. % silica) or HiSil (a precipitated hydrated SiO2 containing about 87 wt. % silica, about 6 wt. % free H$_2$O and about 4.5 wt. % bound H$_2$O of hydration and having a particle size of about 0.02 micron) favors crystalline MCM-56 formation from the above mixture under the synthesis conditions required. Preferably, therefore, the YO$_2$, e.g., silica, source contains at least about 30 wt. % solid YO$_2$, e.g., silica, and more preferably at least about 40 wt. % solid YO$_2$, e.g., silica.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof, with hexamethyleneimine being particularly preferred.

It should be realized that the reaction mixture components can be supplied by more than one source. The reaction mixture can be prepared either batchwise or continuously.

Crystallization of the present layered material can be carried out at either static or stirred conditions in a suitable reactor vessel, such as for example, polypropylene jars or teflon lined or stainless steel autoclaves. The total useful range of temperatures for crystallization is from about 80° C. to about 225° C. However, to avoid excessively long synthesis times the temperature is preferably of at least 120° C. More preferably, the synthesis temperature is about 120° C. to 155° C. and most preferably about 120° C. to 140° C.

It is critical, however, for synthesis of MCM-56 from the above reaction mixture to stop and quench the reaction prior to the onset of significant MCM-49 formation at the expense of MCM-56. Thereafter, the MCM-56 is separated from the liquid and recovered.

One method for controlling the synthesis to produce the required MCM-56 involves monitoring the x-ray diffraction pattern in the 8.8–11.2 Angstrom d-spacing range. MCM-56 is characterized by a broad band centered around d-spacing 9.9 Angstroms, whereas MCM-49 exhibits two resolved maxima at approximately 8.8–9.2 Angstroms and 10.8–11.2 Angstroms with a distinct depression between them. While the band in the 8.8–11.2 Angstrom d-spacing range for the synthesis mixture may have an asymmetric profile, for example with an inflection point, the emergence of a depression may be indicative of the onset of MCM-49 formation and the loss of MCM-56.

MCM-56 prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, MCM-56 can be extruded before drying or partially dried and then extruded.

The layered MCM-56 material of this invention may be used as an adsorbent, such as for separating at least one component from a mixture of components in the vapor or liquid phase having differential sorption characteristics with respect to MCM-56. Therefore, at least one component can be partially or substantially totally separated from a mixture of components having differential sorption characteristics with respect to MCM-56 by contacting the mixture with the MCM-56 to selectively sorb the one component.

The layered MCM-56 material of this invention can be used to catalyze a wide variety of chemical conversion processes including many of present commercial/industrial importance. Examples of chemical conversion processes which are effectively catalyzed by MCM-56, by itself or in combination with one or more other catalytically active substances including other crystalline catalysts, include those requiring a catalyst with acid activity. Specific examples include:

(1) alkylation of aromatic hydrocarbons, e.g., benzene, with long chain olefins, e.g., C14 olefin, with reaction conditions including a temperature of from about 340° C. to about 500° C., a pressure of from about atmospheric to about 200 atmospheres, a weight hourly space velocity of from about 2 hr-1 to about 2000 hr-1 and an aromatic hydrocarbon/olefin mole ratio of from about 1/1 to about 20/1, to provide long chain alkyl aromatics which can be subsequently sulfonated to provide synthetic detergents;

(2) alkylation of aromatic hydrocarbons with gaseous olefins to provide short chain alkyl aromatic compounds, e.g., the alkylation of benzene with propylene to provide cumene, with reaction conditions including a temperature of from about 10° C. to about 125° C., a pressure of from about 1 to about 30 atmospheres, and an aromatic hydrocarbon weight hourly space velocity (WHSV) of from 5 hr-1 to about 50 hr-1;

(3) alkylation of reformate containing substantial quantities of benzene and toluene with fuel gas containing C5 olefins to provide, inter alia, mono- and dialkylates with reaction conditions including a temperature of from 315° C. to about 455° C., a pressure of from about 400 to about 800 psig, a WHSV-olefin of from about 0.4 hr-1 to about 0.8 hr-1, a WHSV-reformate of from about 1 hr-1 to about 2 hr-1 and a gas recycle of from about 1.5 to 2.5 vol/vol fuel gas feed;

(4) alkylation of aromatic hydrocarbons, e.g., benzene, toluene, xylene and naphthalene, with long chain olefins, e.g., C14 olefin, to provide alkylated aromatic lube base stocks with reaction conditions including a temperature of from about 160° C. to about 260° C. and a pressure of from about 350 to 450 psig;

(5) alkylation of phenols with olefins or equivalent alcohols to provide long chain alkyl phenols with reaction conditions including a temperature of from about 200° C. to about 250° C., a pressure of from about 200 to 300 psig and a total WHSV of from about 2 hr-1 to about 10 hr-1; and (6) alkylation of isoalkanes, e.g., isobutane, with olefins, e.g., 2-butene, with reaction conditions including a temperature of from about −25° C. to about 400° C., e.g., from 75° C. to 200° C., a pressure of from below atmospheric to about 35000 kPa (5000 psig), e.g., from 100 to 7000 kPa (1 to 1000 psig), a weight hourly space velocity based on olefin of from about 0.01 hr-1 to about 100 hr-1, e.g., from 0.1 hr-1 to 20 hr-1, and a mole ratio of total isoalkane to total olefin of from about 1:2 to about 100:1, e.g., from 3:1 to 30:1.

(7) disproportionation/transalkylation of alkyl-aromatics, e.g. toluene, with reaction conditions including a temperature of about 200° to 760° C., a pressure of about atmospheric to about 60 atmospheres and a weight hourly space velocity of about 0.1 about 20.

When used as a catalyst, it may be desirable to incorporate MCM-56 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the MCM-56, i.e., combined therewith or present during synthesis of MCM-56, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present MCM-56 layered material also include inorganic oxides, notably alumina.

In addition to the foregoing materials, the MCM-56 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided MCM-56 material and inorganic oxide matrix vary widely, with the MCM-56 content ranging from about 1 to about 90 percent by weight and more usually, particularly when the composite is prepared in the form of beads, in the range of about 2 to about 80 wt. % of the composite.

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec-1). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538 C. and a variable flow rate as described in detail in the *Journal of Catalysis*, Vol. 61, p. 395.

EXAMPLE 1

A mixture of 258 grams of water, 6 grams of 50% sodium hydroxide solution, 13.4 grams of a 45% sodium aluminate solution (25.5% Al2O3 and 19.5% Na2O), 51.4 grams of Ultrasil (VN3), and 27.1 grams of hexamethyleneimine (HMI) was reacted in a 600 ml stirred (400 rpm) autoclave at 143° C.

The reaction mixture had the following composition in mole ratios:

$SiO_2/Al_2O_3=23$ $OH^-/SiO_2=0.21$ $Na/SiO_2=0.21$ $HMI/SiO_2 0.35$ $H_2O/SiO_2 20$

The reaction was stopped at 34 hours. The product was filtered, washed with water to form a wet cake, and a portion was dried in an oven at 110° C.

A portion of the product wet cake and the dried portion were submitted for x-ray analysis and identified as MCM-56. The x-ray diffraction pattern of the dried MCM-56 is presented below in Table VI and shown in FIG. 1.

TABLE VI

| 2 theta | d(A) | I/Io | Comments[a] |
|---------|------|------|-------------|
| 4.1     | 21.6 | 10   | B           |
| 6.94    | 12.74| 34   | B, sh       |
| 7.15    | 12.36| 100  | S           |
| 8.9     | 9.9  | 32   | VVB         |
| 12.84   | 6.89 | 12   | B           |
| 13.89   | 6.38 | 7    | VB, sh      |
| 14.32   | 6.18 | 15   | S           |
| 15.92   | 5.57 | 8    | VVB         |
| 19.94   | 4.45 | 30   | VVB         |
| 21.98   | 4.04 | 43   | B           |
| 22.51   | 3.95 | 59   | VB          |
| 23.44   | 3.80 | 28   | VVB         |
| 24.97   | 3.57 | 43   | S           |
| 25.93   | 3.44 | 100  | S           |
| 26.61   | 3.35 | 51   | B           |
| 31.52   | 2.838| 5    | S           |
| 33.40   | 2.683| 10   | VVB         |
| 34.71   | 2.584| 3    | VVB         |
| 36.26   | 2.477| 3    | S           |
| 37.00   | 2.429| 3    | S           |
| 37.75   | 2.383| 9    | S           |

[a]S = sharp, B = broad, VB = very broad, VVB = very very broad, sh = shoulder

The chemical composition of the product of Example 1 was, in wt. %,

N=1.61

Na=1.1

$Al_2O_3=6.6$ $SiO_2=70.5$

Ash=78.2

The SiO2/Al2O3 molar ratio of this product was 18.

EXAMPLE 2

Figure 2:
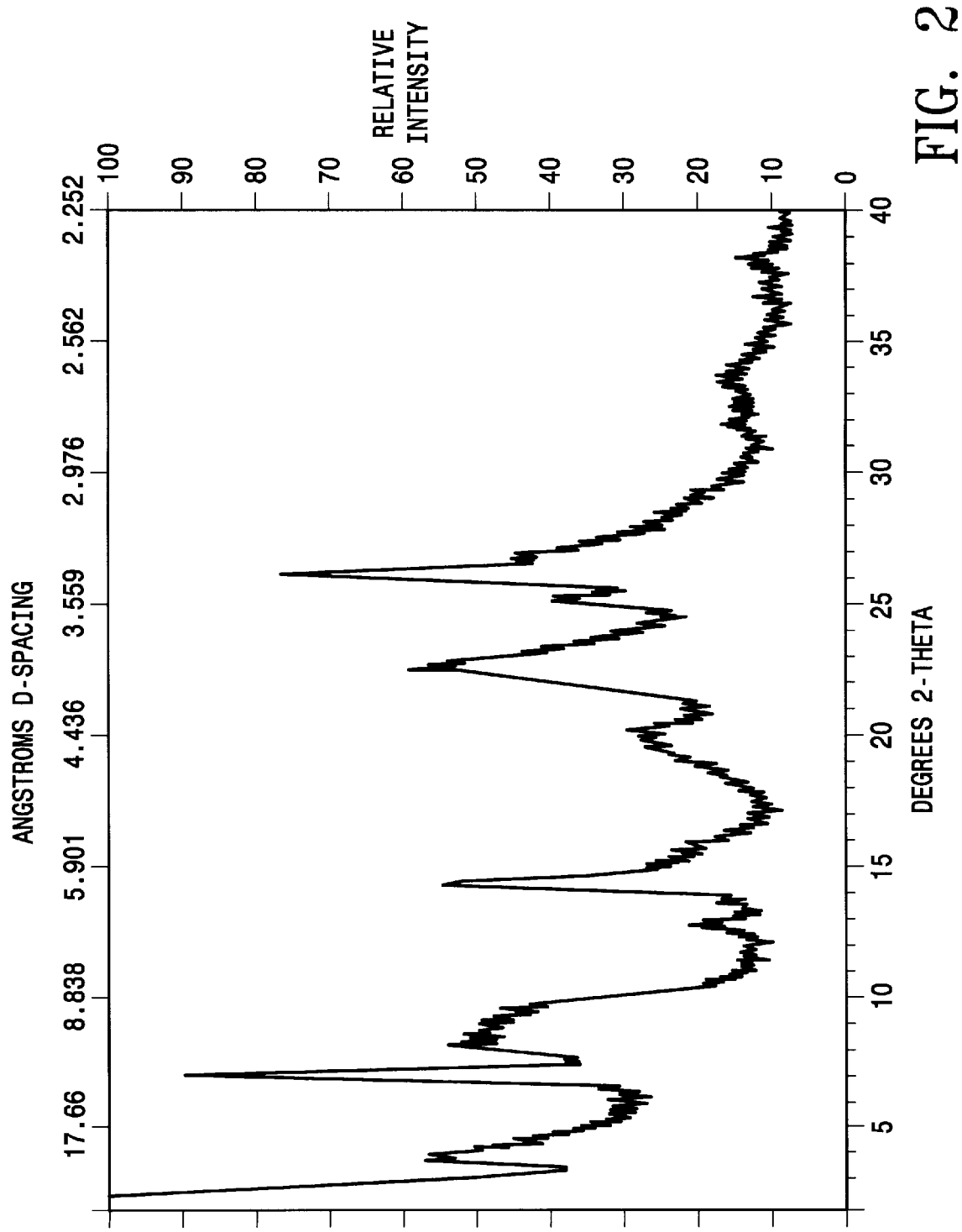
FIG. 2 shows the x-ray diffraction pattern of the calcined product MCM-56 of Example 2.

A portion of the product of Example 1 was ammonium exchanged by contacting three times with 1M ammonium nitrate, and then calcined in air for 6 hours at 540° C. The x-ray diffraction pattern of the calcined product of this example proved it to be MCM-56 and is presented below in Table VII and shown in FIG. 2.

TABLE VII

| 2 theta | d(A) | I/Io | Comments[a] |
|---|---|---|---|
| 4.1 | 21.6 | 37 | B |
| 7.14 | 12.38 | 97 | S |
| 8.9 | 9.9 | 33 | VVB |
| 12.80 | 6.92 | 12 | B |
| 14.42 | 6.14 | 59 | S |
| 15.80 | 5.61 | 14 | VVB |
| 19.76 | 4.49 | 27 | VVB |
| 22.45 | 3.96 | 73 | VVB |
| 23.75 | 3.75 | 26 | VVB |
| 25.10 | 3.55 | 37 | S |
| 26.05 | 3.42 | 100 | S |
| 26.79 | 3.33 | 35 | B |
| 31.75 | 2.818 | 6 | S |
| 33.52 | 2.673 | 10 | VVB |
| 34.82 | 2.576 | 4 | VVB |
| 36.44 | 2.466 | 3 | S |
| 37.96 | 2.370 | 6 | S |

[a]S = sharp, B = broad, VVB = very very broad

EXAMPLE 3

The product of Example 2 was subjected to the Alpha Test which indicated an Alpha value of 106.

EXAMPLE 4

Example 1 was repeated, except that the reaction was stopped at 40 hours. X-ray analysis proved the product to be MCM-56.

EXAMPLE 5

A mixture of 258 grams of water, 20.5 grams of sodium aluminate solution (25.5% Al2O3 and 19.5% Na2O), 51.4 grams of Ultrasil (VN3), and 50 grams of hexamethyleneimine (HMI) was reacted in a 600 ml stirred (400 rpm) autoclave at 154° C.

The reaction mixture had the following composition in mole ratios:

SiO2/Al2O3=15

OH-/SiO2=0.17

Na/SiO2=0.17

HMI/SiO2=0.66

H2O/SiO2=19

The reaction was stopped at 130 hours. The product was filtered, washed with water to form a wet cake, and a portion was dried in an oven for 2 hours at 110° C.

Figure 3:
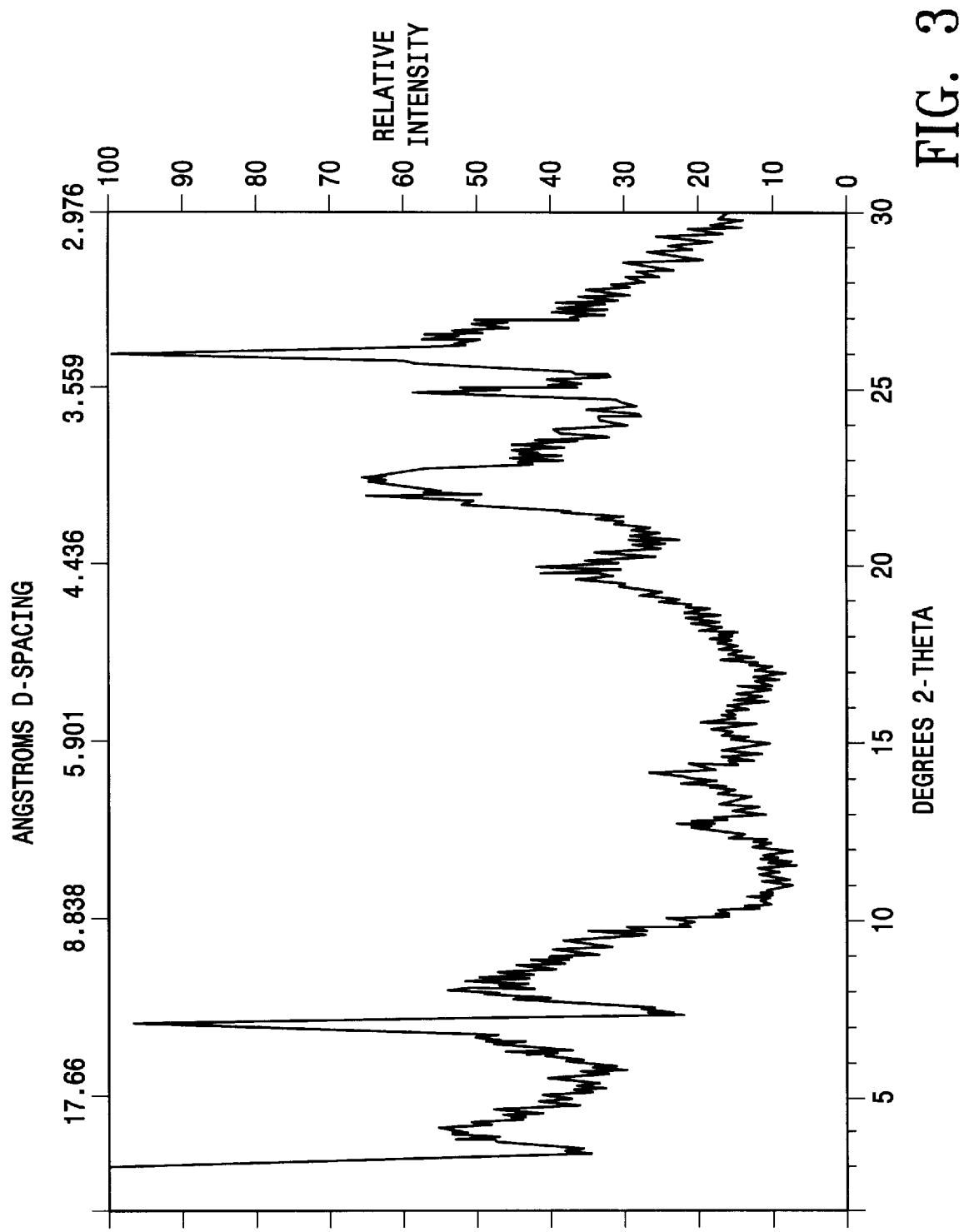
FIG. 3 shows the x-ray diffraction pattern of the dried product MCM-56 of Example 5.

A portion of the product wet cake and the dried portion were submitted for X-ray analysis and identified as MCM-56. The X-ray diffraction pattern of the dried material is presented below in Table VIII and shown in FIG. 3.

TABLE VIII

| 2 theta | d(A) | I/Io | Comments[a] |
|---|---|---|---|
| 4.1 | 21.6 | 30 | B |
| 6.67 | 13.25 | 23 | B, sh[b] |
| 6.96 | 12.70 | 24 | B |
| 7.16 | 12.35 | 80 | S |
| 8.9 | 9.9 | 21 | VVB |
| 12.86 | 6.88 | 14 | B |
| 13.98 | 6.33 | 7 | VB, sh |
| 14.33 | 6.18 | 15 | S |
| 15.85 | 5.59 | 7 | VVB |
| 19.93 | 4.45 | 25 | VVB |
| 21.95 | 4.05 | 42 | VB |
| 22.56 | 3.94 | 38 | B |
| 23.46 | 3.79 | 26 | VVB |
| 24.94 | 3.57 | 39 | S |
| 25.94 | 3.43 | 100 | S |
| 26.64 | 3.35 | 33 | B |

[a]S = sharp, B = broad, VB = very broad, VVB = very very broad, sh = shoulder
[b]Possible trace of MCM-22 precursor The chemical composition of the product of Example 5 was, in wt. %,

N=1.42

Na=2.3

Al2O3=9.3

SiO2=70.7

Ash=82.3

The $SiO_2/Al_2O_3$ molar ratio of this product was 13.

EXAMPLE 6

Figure 4:
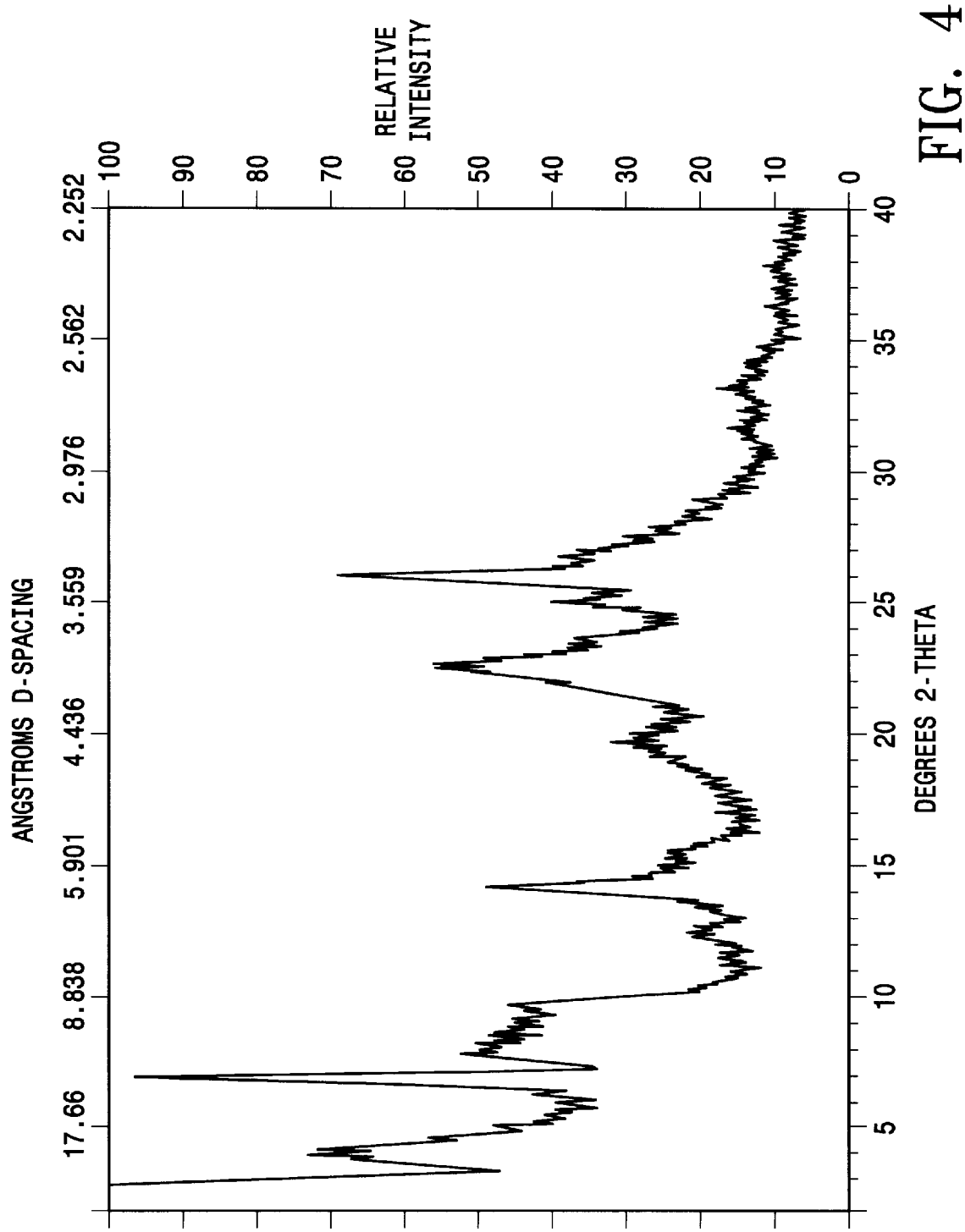
FIG. 4 shows the x-ray diffraction pattern of the calcined product MCM-56 of Example 6.

A portion of the dried sample from Example 5 was subjected to a three-fold exchange with a 1M ammonium nitrate solution. The solid was then heated in nitrogen at 482° C. for 3 hours, cooled to about 130° C., and then calcined in air at 538° C. for 5 hours. This material exhibited the x-ray diffraction pattern shown in Table IX and FIG. 4.

TABLE IX

| 2 theta | d(A) | I/Io | Comments[a] |
|---|---|---|---|
| 4.3 | 20.5 | 69 | B |
| 7.13 | 12.40 | 100 | S |
| 8.1 | 10.9 | 33 | VVB |
| 9.8 | 9.0 | 37 | VVB |
| 12.79 | 6.92 | 12 | B |
| 14.38 | 6.16 | 48 | S |
| 15.78 | 5.62 | 17 | VVB |
| 19.74 | 4.50 | 24 | VVB |
| 22.45 | 3.96 | 69 | VVB |
| 23.70 | 3.75 | 23 | VVB |
| 25.10 | 3.55 | 36 | S |
| 26.05 | 3.42 | 88 | S |
| 26.86 | 3.32 | 27 | B |
| 31.71 | 2.822 | 5 | S |
| 33.34 | 2.687 | 9 | B |
| 34.30 | 2.614 | 6 | VVB |
| 36.40 | 2.468 | 5 | S |
| 37.92 | 2.373 | 5 | S |

[a]S = sharp, B = broad, VVB = very very broad

EXAMPLE 7

19.6 parts of water were added to 0.7 parts of 50% NaOH and charged to an autoclave. To this mixture were added 1.0 part of a 45% sodium aluminate solution followed by 3.9 parts of precipitated silica. After the silica was incorporated into solution, 2.1 parts of hexamethyleneimine (HMI) were added to the autoclave. The synthesis mixture was crystallized at 143° C. (290° F.) with mixing at 90 rpm for 90 hours. The autoclave contents were then flashed to remove organic, cooled and discharged.

Figure 5:
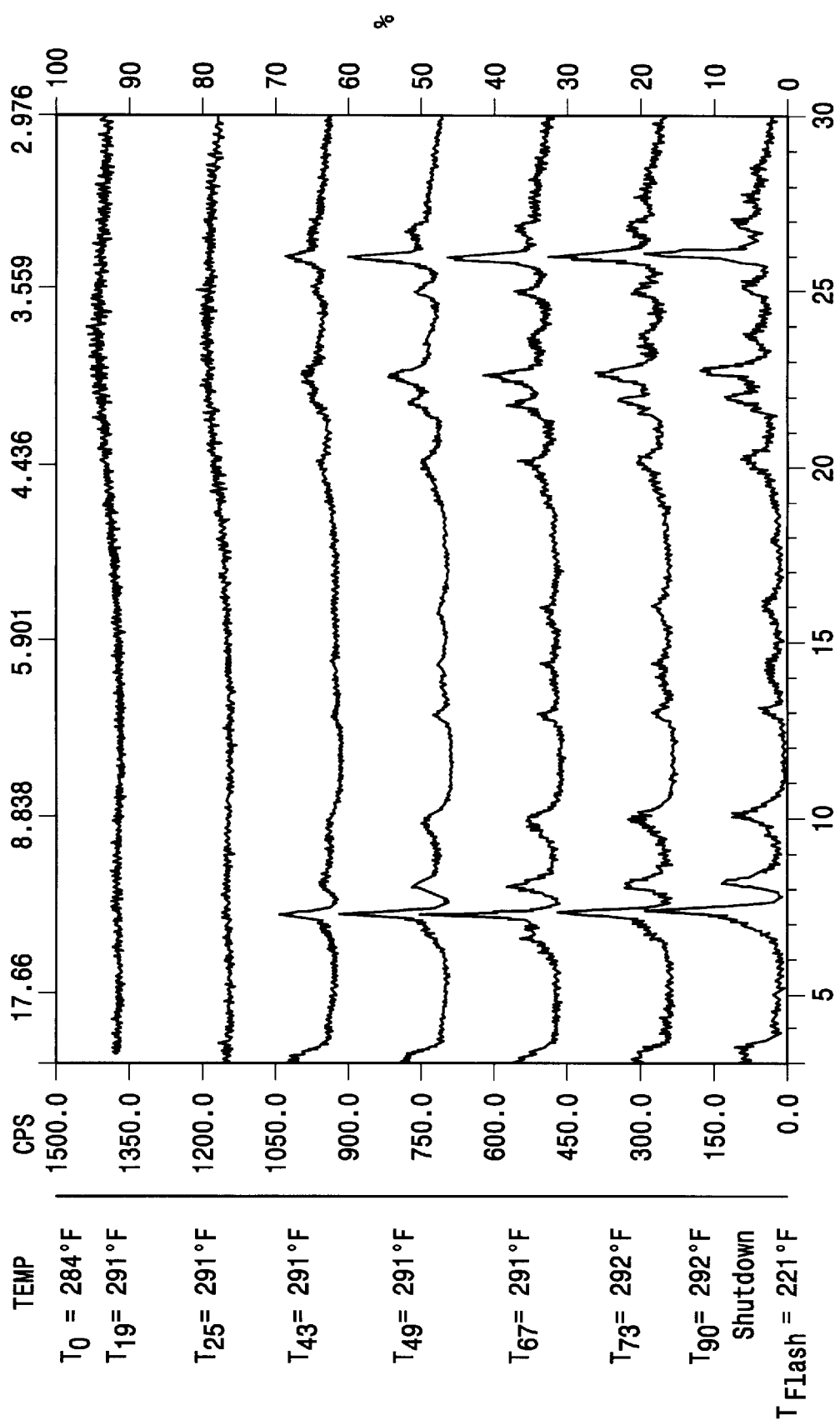
FIG. 5 shows the x-ray diffraction patterns of the Example 7 products after various crystallization times.

Slurry samples for x-ray diffraction were taken at 19, 25, 43, 49, 67, 73 and 90 hours (final). FIG. 5 shows the x-ray diffraction patterns for these materials. The two samples at 19 and 25 hours are very amorphous and still in the initial phases of crystallization. The 67, 73 hour and final samples are crystalline MCM-49. However, both the 43 and 49 hour samples are MCM-56 with varying degrees of MCM-49 impurities.

EXAMPLE 8

19.3 parts of water were added to 0.6 parts of 50% NaOH and charged to an autoclave. To this mixture were added 1.0 part of a 45% sodium aluminate solution followed by 3.8 parts of precipitated silica. After the silica was incorporated into solution, 2.0 parts of hexamethyleneimine (HMI) were added to the autoclave. The synthesis mixture was crystallized at 132° C. (270° F.) with mixing at 250 rpm for 90 hours. The autoclave contents were then cooled and the contents discharged.

Figure 6:
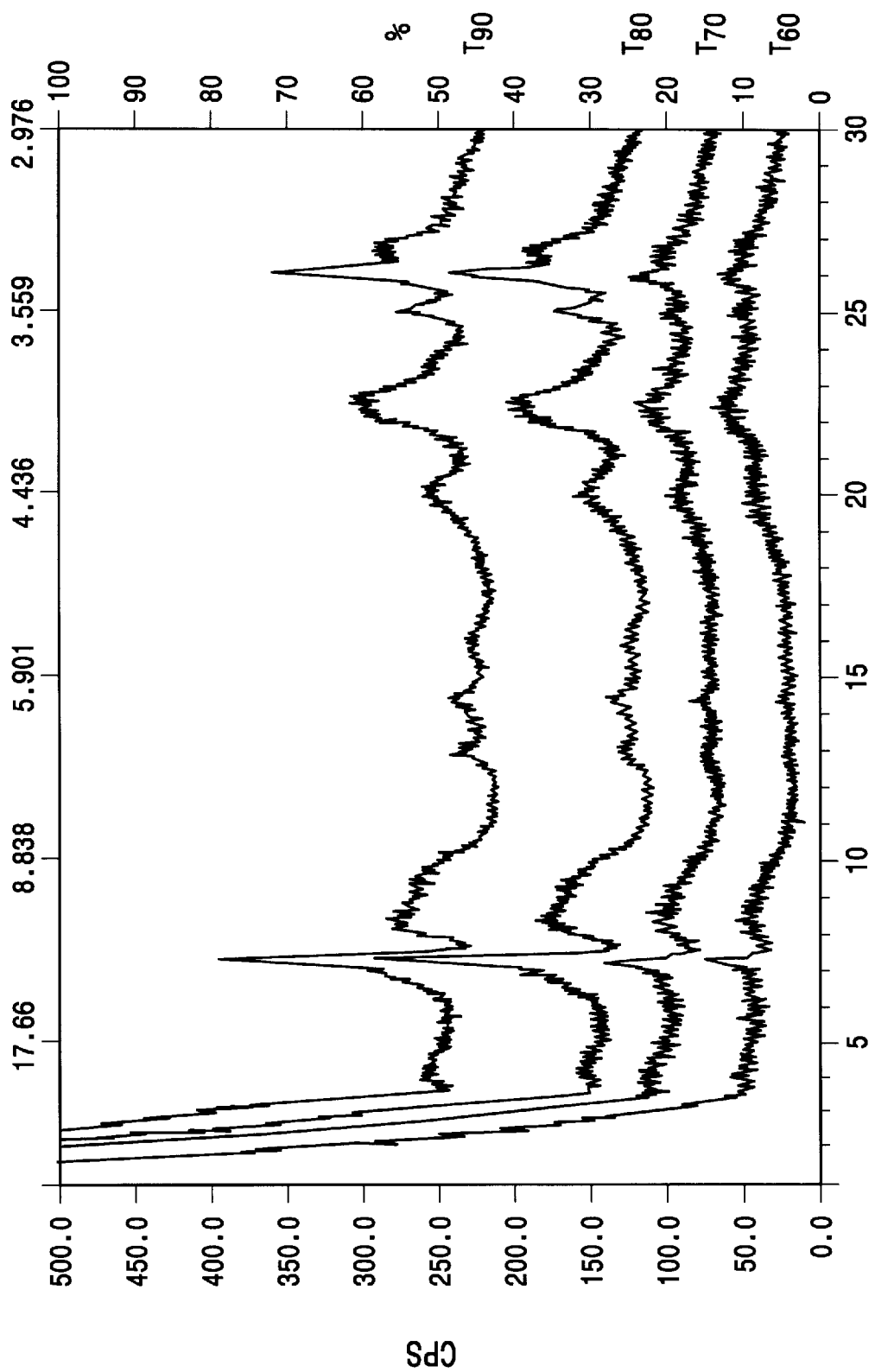
FIG. 6 shows the x-ray diffraction patterns of the Example 8 products after various crystallization times.

Slurry samples for x-ray diffraction were taken at 60, 70, 80 and 90 hours (final). FIG. 6 shows the x-ray diffraction patterns for these materials. In contrast to Example 8, the 60, 70, 80 hour and final samples are MCM-56 with varying degrees of crystallinity.

EXAMPLE 9

19.3 parts of water were added to 0.6 parts of 50% NaOH and charged to an autoclave. To this mixture were added 1.0 part of a 45% sodium aluminate solution followed by 3.8 parts of precipitated silica. After the silica was incorporated into solution, 2.0 parts of hexamethyleneimine (HMI) were added to the autoclave. The synthesis mixture was crystallized at 132° C. (270° F.) with mixing at 90 rpm for 95 hours. The autoclave contents were then flashed to remove organic, cooled and discharged.

Figure 7:
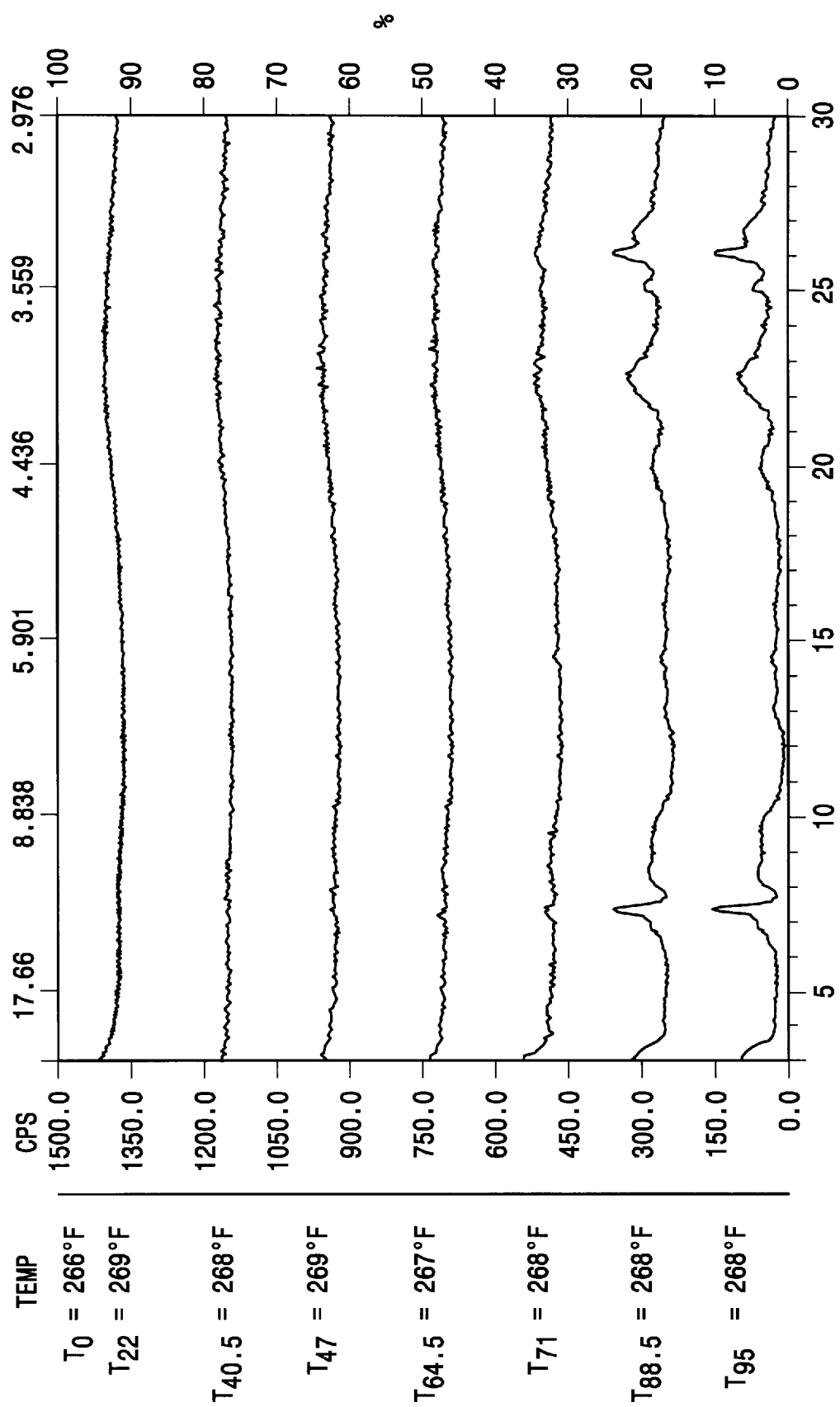
FIG. 7 shows the x-ray diffraction patterns of the Example 9 products after various crystallization times.

Slurry samples for x-ray diffraction were taken at 22, 40.5, 47, 64.5, 71, 88.5 and 95 hours. FIG. 7 shows the x-ray diffraction patterns for these materials. Similar to Example 8, the 71, 88.5 and 95 hour samples are MCM-56 with varying degrees of crystallinity.

EXAMPLE 10

19.3 parts of water were added to 0.7 parts of 50% NaOH and charged to an autoclave. To this mixture were added 1.0 part of a 45% sodium aluminate solution followed by 3.9 parts of precipitated silica. After the silica was incorporated into solution, 2.1 parts of hexamethyleneimine (HMI) were added to the autoclave. The synthesis mixture was crystallized at 132° C. (270° F.) with mixing at 90 rpm for 95 hours. The autoclave contents were then flashed to remove organic, cooled and discharged.

Figure 8:
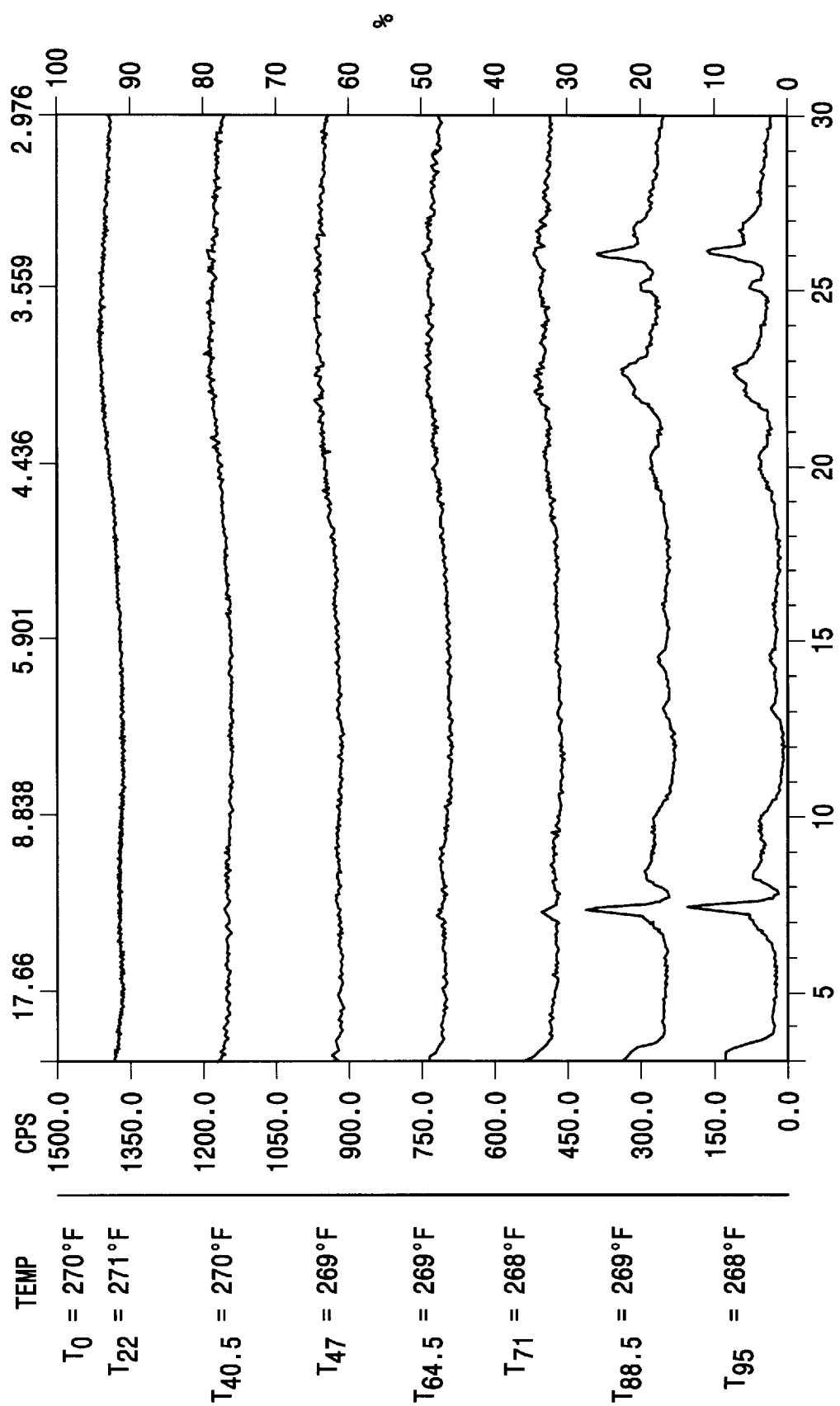
FIG. 8 shows the x-ray diffraction patterns of the Example 10 products after various crystallization times.

Slurry samples for x-ray diffraction were taken at 22, 40.5, 47, 64.5, 71, 88.5 and 95 hours. FIG. 8 shows the x-ray diffraction patterns for these materials. Similar to Examples 8 and 9, the 71, 88.5 and 95 hour samples are MCM-56 with varying degrees of crystallinity.

EXAMPLE 11

19.6 parts of water were added to 0.7 parts of 50% NaOH and charged to an autoclave. To this mixture were added 1.0 part of a 45% sodium aluminate solution followed by 3.9 parts of precipitated silica. After the silica was incorporated into solution, 2.1 parts of hexamethyleneimine (HMI) were added to the autoclave. The synthesis mixture was crystallized at 121° C. (250° F.) with mixing at 250 rpm for 90 hours. The autoclave contents were then cooled and the contents discharged.

Figure 9:
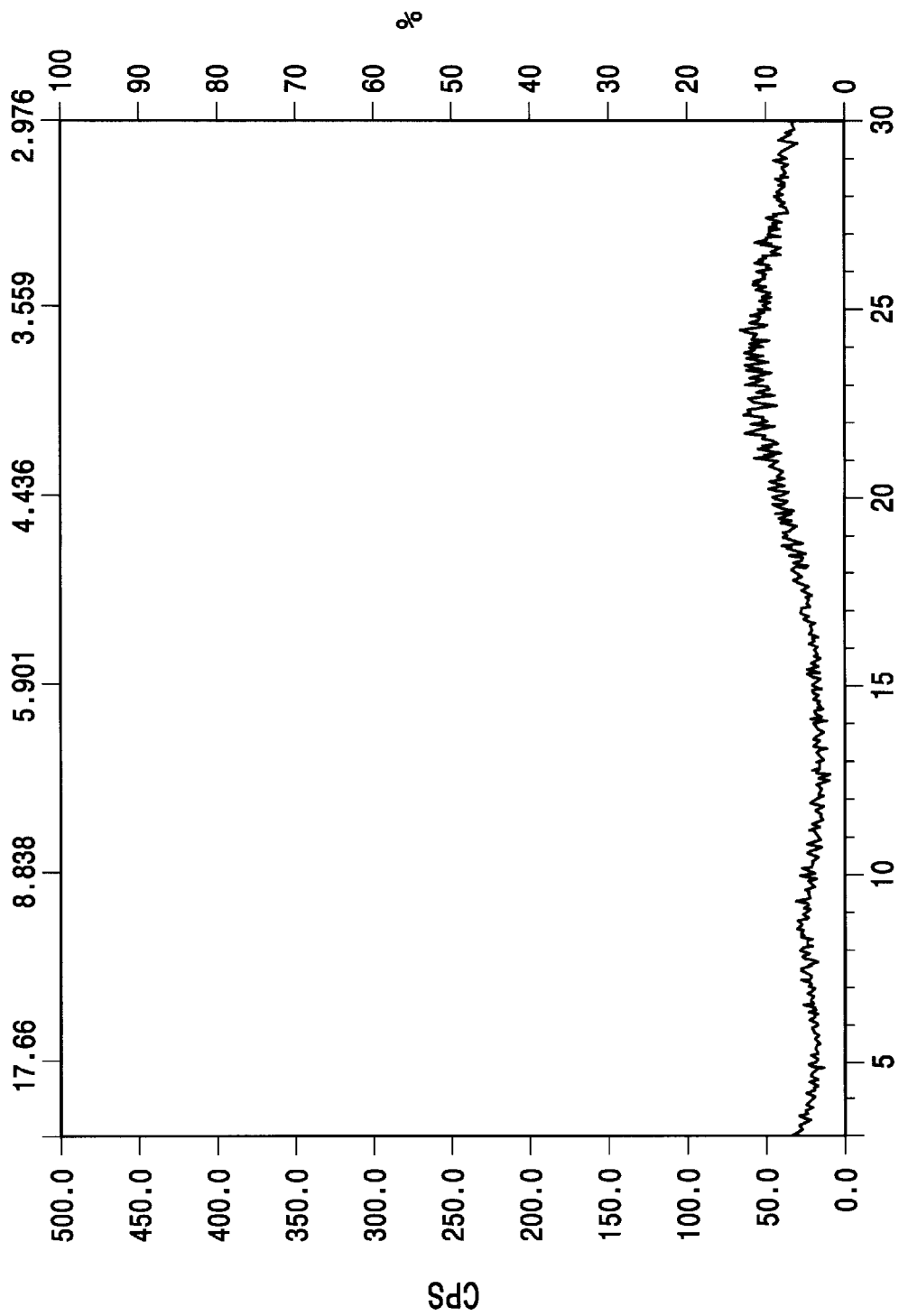
FIG. 9 shows the x-ray diffraction patterns of the Example 11 products after various crystallization times.

The x-ray diffraction pattern for the 90 hour material is shown in FIG. 9. The material is amorphous, but is similar to the 22, 40.5 and 47 hour samples from Examples 9 and 10. This indicates that at 121° C. (250° F.) a much longer crystallization time is required before MCM-56 is produced.

We claim:

1. A process for the synthesis of a synthetic porous crystalline material, MCM-56, which has an x-ray diffraction pattern including the lines listed in Table I, the process comprising the steps of:

a) preparing a reaction mixture containing sources of alkali or alkaline earth metal (M) cation, an oxide of an trivalent element X, an oxide of a tetravalent element Y containing at least 30 wt. % of solid $YO_2$, a directing agent (R), and water, said reaction mixture having a composition, in terms of mole ratios of oxides, within the following ranges:
 $YO_2/X_2O_3$ 5 to 35
 $H_2O/YO_2$ 10 to 70
 $OH^-/YO_2$ 0.05 to 0.5
 $M/YO_2$ 0.05 to 3.0
 $R/YO_2$ 0.1 to 1.0 b) crystallizing said mixture at a temperature of about 80° C. to about 225° C. to form crystals of MCM-56, c) terminating said crystallization prior to the formation of MCM-49, and d) separating the MCM-56 crystals from the reaction mixture.

2. The process of claim 1 wherein the crystallization is terminated prior to the formation of MCM-49 as indicated by x-ray diffraction analysis in the 8.8–11.2 Angstrom d-spacing range.

3. The process of claim 1 wherein the crystallization temperature is at least 120° C.

4. The process of claim 1 wherein the crystallization temperature is in the range of about 120° C. to about 155° C.

5. The process of claim 1 wherein the crystallization temperature is in the range of about 125° C. to about 140° C.

6. The process of claim 1 wherein the MCM-56 crystals have a composition, on an anhydrous basis and in terms of moles of oxides per n moles of $YO_2$, expressed by the formula:

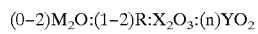

$$(0-2)M_2O:(1-2)R:X_2O_3:(n)YO_2$$

wherein n is less than about 35.

7. The process of claim 6 wherein n is from about 5 to less than about 25.

8. The process of claim 6 wherein n is from about 10 to about 20.

9. The process of claim 1 wherein said R is selected from the group consisting of cycloalkylamine, azacycloalkane, diazacycloalkane, and mixtures thereof.

10. The process of claim 1 wherein R is selected from the group consisting of cyclopentylamine, cyclohexylamine, cycloheptylamine, hexamethyleneimine, heptamethyleneimine, homopiperazine, and combinations thereof.

11. The process of claim 1 wherein R is hexamethyleneimine.

12. The process of claim 1 wherein X comprises aluminum and Y comprises silicon.

* * * * *